(12) United States Patent
Golsch et al.

(10) Patent No.: US 10,839,627 B2
(45) Date of Patent: Nov. 17, 2020

(54) REFLECTIVE ENVIRONMENT DETECTION SYSTEMS AND METHODS

(71) Applicants: DENSO International America, Inc., Southfield, MI (US); DENSO CORPORATION, Kariya (JP)

(72) Inventors: Kyle Golsch, Pontiac, MI (US); Raymond Michael Stitt, Holland, MI (US); Eric Smith, Holland, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 0 days.

(21) Appl. No.: 16/359,166

(22) Filed: Mar. 20, 2019

(65) Prior Publication Data

US 2019/0304226 A1 Oct. 3, 2019

Related U.S. Application Data

(60) Provisional application No. 62/648,995, filed on Mar. 28, 2018.

(51) Int. Cl.
*G07C 9/00* (2020.01)
*G01S 1/02* (2010.01)
(Continued)

(52) U.S. Cl.
CPC .......... *G07C 9/00309* (2013.01); *G01S 1/026* (2013.01); *G01S 5/021* (2013.01);
(Continued)

(58) Field of Classification Search
CPC ... B60R 25/245; B60R 25/24; G07C 9/00571; G07C 9/00309; G07C 2209/65;
(Continued)

(56) References Cited

U.S. PATENT DOCUMENTS 7,705,710 B2 * 4/2010 Hermann ................. B60R 25/24
340/426.11
8,077,011 B2 * 12/2011 McBride ............... B60R 25/245
340/10.1
(Continued)

FOREIGN PATENT DOCUMENTS

BR 102014017465 A2 2/2016
CN 104574593 A 4/2015
(Continued)

*Primary Examiner* — Nam V Nguyen
(74) *Attorney, Agent, or Firm* — Harness, Dickey & Pierce, P.L.C.

(57) ABSTRACT

Systems and methods are provided that include a control module of a vehicle. The control module instructs at least one of a beacon and a plurality of sensors to broadcast a ping signal in response to a user device being within a threshold distance of the vehicle. The plurality of sensors communicate signal information to the control module, and the signal information indicates an amount of reflection of the ping signal measured by the plurality of sensors. A sensor calibration module (i) determines a presence of a reflective element based on the signal information, and (ii) in response to determining the presence of the reflective element and the user device being connected to a communication gateway of the control module, adjusts a measurement of a first sensor of the plurality of sensors based on the signal information.

16 Claims, 9 Drawing Sheets

(51) Int. Cl.
*H04B 17/21* (2015.01)
*G01S 5/02* (2010.01)
*G07C 9/28* (2020.01)
*H04B 17/12* (2015.01)
*B60R 25/24* (2013.01)
*H01Q 1/32* (2006.01)

(52) U.S. Cl.
CPC ........ *G01S 5/0273* (2013.01); *G07C 9/00571* (2013.01); *G07C 9/28* (2020.01); *H04B 17/21* (2015.01); *B60R 25/24* (2013.01); *G07C 2209/63* (2013.01); *H01Q 1/3241* (2013.01); *H04B 17/12* (2015.01)

(58) Field of Classification Search
CPC ...... G07C 2009/00769; G07C 2209/63; G07C 9/28; G01S 11/02; G01S 11/06; G01S 5/0273; G01S 5/021; G01S 1/026; G01S 13/765; H04B 17/21; H04B 17/12; H01Q 1/3241
USPC ..................... 340/5.72, 10.1–10.5, 4.26, 539
See application file for complete search history.

(56) References Cited

U.S. PATENT DOCUMENTS

| | | | |
|---|---|---|---|
| 8,744,482 B2 * | 6/2014 | Margalef | G01S 5/0252 340/5.61 |
| 8,930,045 B2 | 1/2015 | Oman et al. | |
| 9,123,244 B2 | 9/2015 | Daman et al. | |
| 9,218,696 B2 * | 12/2015 | Dumas | E05B 47/00 |
| 9,467,817 B1 * | 10/2016 | Van Wiemeersch | H04W 4/029 |
| 9,688,247 B1 | 6/2017 | Jayaraman et al. | |
| 9,751,497 B2 * | 9/2017 | Sanji | G06K 9/00791 |
| 9,794,753 B1 | 10/2017 | Stitt et al. | |
| 9,894,492 B1 | 2/2018 | Elangovan et al. | |
| 10,002,479 B2 | 6/2018 | Oz et al. | |
| 10,380,817 B2 * | 8/2019 | Kim | E05B 81/78 |
| 10,539,660 B2 * | 1/2020 | Berezin | G01S 13/42 |
| 2009/0264082 A1 * | 10/2009 | Tieman | G01S 1/66 455/73 |
| 2011/0215921 A1 | 9/2011 | Ben Ayed et al. | |
| 2012/0045058 A1 | 2/2012 | Weghaus | |
| 2013/0214732 A1 | 8/2013 | Nowottnick | |
| 2014/0152091 A1 | 6/2014 | Muller et al. | |
| 2014/0188348 A1 | 7/2014 | Gautama et al. | |
| 2014/0240091 A1 | 8/2014 | Talty et al. | |
| 2014/0274013 A1 | 9/2014 | Santavicca | |
| 2014/0330449 A1 | 11/2014 | Oman et al. | |
| 2015/0148989 A1 | 5/2015 | Cooper et al. | |
| 2015/0161832 A1 | 6/2015 | Esselink et al. | |
| 2015/0161834 A1 | 6/2015 | Spahl et al. | |
| 2015/0310681 A1 | 10/2015 | Avery et al. | |
| 2015/0356797 A1 | 12/2015 | McBride et al. | |
| 2016/0050563 A1 | 2/2016 | Bronk | |
| 2016/0063786 A1 | 3/2016 | Lewis et al. | |
| 2016/0087485 A1 | 3/2016 | Maeda et al. | |
| 2016/0150407 A1 | 5/2016 | Michaud et al. | |
| 2017/0018128 A1 | 1/2017 | Berezin et al. | |
| 2017/0062938 A1 | 3/2017 | Cheng et al. | |
| 2017/0104589 A1 | 4/2017 | Lambert et al. | |
| 2017/0132533 A1 | 5/2017 | Darnell et al. | |
| 2017/0236351 A1 | 8/2017 | Menard et al. | |
| 2017/0261606 A1 | 9/2017 | Suchy et al. | |
| 2017/0303080 A1 | 10/2017 | Stitt et al. | |
| 2017/0303090 A1 | 10/2017 | Stitt et al. | |
| 2017/0309098 A1 | 10/2017 | Watters et al. | |
| 2017/0330402 A1 | 11/2017 | Menard et al. | |
| 2018/0007507 A1 * | 1/2018 | Ghabra | H04B 1/3822 |
| 2018/0029560 A1 | 2/2018 | Mohaupt et al. | |
| 2018/0099643 A1 | 4/2018 | Golsch et al. | |
| 2018/0103414 A1 | 4/2018 | Golsch | |
| 2018/0126952 A1 | 5/2018 | Niemiec | |
| 2018/0154865 A1 | 6/2018 | Bianchi, III et al. | |
| 2018/0269565 A1 | 9/2018 | Guthrie et al. | |
| 2020/0010050 A1 * | 1/2020 | Spick | G01S 11/02 |

FOREIGN PATENT DOCUMENTS

| | | |
|---|---|---|
| EP | 2800068 A2 | 11/2014 |
| FR | 3026212 A1 | 3/2016 |
| WO | WO-2015177298 A1 | 11/2015 |
| WO | WO-16156682 A1 | 10/2016 |
| WO | WO-2017/181035 A1 | 10/2017 |
| WO | WO-2017/181050 A1 | 10/2017 |
| WO | WO-18040641 A1 | 3/2018 |

* cited by examiner

REFLECTIVE ENVIRONMENT DETECTION SYSTEMS AND METHODS

CROSS-REFERENCE TO RELATED APPLICATION

This application claims the benefit of U.S. Provisional Application No. 62/648,995, filed on Mar. 28, 2018. The entire disclosure of the above application is incorporated herein by reference.

FIELD

The present disclosure relates to systems and methods for detecting reflective elements and calibrating a plurality of sensors of a vehicle based on the reflective elements.

BACKGROUND

This section provides background information related to the present disclosure which is not necessarily prior art.

Traditionally, a passive entry/passive start (PEPS) system, which is a vehicle system that includes a keyless entry system, allows anyone in possession of a key fob that has been previously paired with a vehicle's central PEPS electronic control unit (ECU) to access the vehicle by simply grabbing the door handle and to start the vehicle with a push of a button. In response to a button push, the central PEPS ECU authenticates the key fob to determine if the key fob is authorized to access the vehicle and uses the signal strength indicated by a plurality of vehicle antennas to estimate the location of the Key Fob. If the Key Fob can be authenticated and is located within an authorizing zone, certain vehicle functions are activated (e.g., doors are unlocked or vehicle is started).

Traditional PEPS systems use proprietary grade radio protocols using low frequency (LF) signals of approximately 125 kHz. Traditional PEPS systems are also hampered by the physics of the LF systems. LF was selected by early PEPS systems because the wave propagation allows for relatively accurate estimation of range and location by using signal strength within the typical target activation range of 2 meters. However, due to the extremely long wavelength of the LF signal compared to the size of a practical vehicle antenna and key fob receiver, it is difficult within reasonable power consumption and safe transmit power levels to reliably communicate with a key fob using LF beyond a few meters. Consequently, it is difficult to make any of the vehicle's functions available to the user when the key fob is located more than a few meters away from the vehicle.

Furthermore, it is desirable to allow users to use their smart devices, such as smartphones and other devices, such as wearable devices, to activate certain vehicle functions. Such systems and advantages are not achievable with traditional PEPS systems because each vehicle manufacturers and PEPS system suppliers traditionally implement proprietary closed systems using radio frequencies that are not used by ubiquitous devices, such as smart phones. Moreover, it is desirable to ensure that any signal measurement errors when using a smart device to activate vehicle functions are accounted for and corrected.

SUMMARY

This section provides a general summary of the disclosure, and is not a comprehensive disclosure of its full scope or all of its features.

The present disclosure provides a system that includes a control module of a vehicle, and the control module is configured to instruct at least one of a beacon and a plurality of sensors to broadcast a ping signal in response to a user device being within a threshold distance of the vehicle. The control module includes at least one processor that is configured to execute instructions stored in a nontransitory memory. The plurality of sensors are configured to communicate signal information to the control module, and the signal information indicates an amount of reflection of the ping signal measured by the plurality of sensors. The system includes a sensor calibration module that is implemented by the at least one processor of the control module. The sensor calibration module is configured to (i) determine a presence of a reflective element based on the signal information, and (ii) in response to determining the presence of the reflective element and the user device being connected to a communication gateway of the control module, adjust a measurement of a first sensor of the plurality of sensors based on the signal information.

In some configurations, the sensor calibration module is configured to, in response to determining the presence of the reflective element and the user device being connected to the communication gateway, adjust the measurement of each sensor of the plurality of sensors based on the signal information.

In some configurations, the measurement of the first sensor of the plurality of sensors includes at least one of a received signal strength, an angle of arrival, and a time of flight and is adjusted by a first value based on the signal information, and the RSSI measurement of a second sensor of the plurality of sensors is adjusted by a second value based on the signal information.

In some configurations, the first value is based on an expected signal strength-range curve, and the expected signal strength-range curve represents a plurality of measurements at corresponding ranges in response to an absence of the reflective element.

In some configurations, the first value is a constant value from which the measurement of the first sensor is offset.

In some configurations, the measurement of the first sensor of the plurality of sensors is adjusted by a first value based on the signal information and in response to the measurement being below a first measurement threshold.

In some configurations, the measurement of the first sensor of the plurality of sensors is adjusted by a second value based on the signal information and in response to the measurement being above the first measurement threshold.

In some configurations, the control module determines that the user device is within the threshold distance of the vehicle based on GPS information of the user device.

In some configurations, the control module determines that the user device is within the threshold distance of the vehicle in response to the user device being connected to the communication gateway.

In some configurations, the ping signal is a Bluetooth signal.

Additionally, the present disclosure provides a method that includes determining, using a control module that includes at least one processor that is configured to execute instructions stored in a nontransitory memory, whether a user device is within a threshold distance of a vehicle. The method includes generating, using the control module and in response to the user device being within the threshold distance of the vehicle, a command for at least one of a beacon and a plurality of sensors to broadcast a ping signal. The method includes broadcasting, in response to receiving the command from the control module, the ping signal. The method includes communicating, using the plurality of sensors, signal information to the control module, and the signal information indicates an amount of reflection of the ping signal measured by the plurality of sensors. The method includes determining, using a sensor calibration module that is implemented by the at least one processor of the control module, a presence of a reflective element based on the signal information. The method includes determining, using the control module, whether the user device is connected to a communication gateway of the control module. The method includes adjusting, using the sensor calibration module and in response to (i) determining the presence of the reflective element and (ii) the user device being connected to the communication gateway of the control module, a measurement of a first sensor of the plurality of sensors based on the signal information.

In some configurations, the method further comprises adjusting, using the sensor calibration module and in response to (i) determining the presence of the reflective element and (ii) the user device being connected to the communication gateway, the measurement of each sensor of the plurality of sensors based on the signal information.

In some configurations, the method further comprises adjusting the measurement of the first sensor of the plurality of sensors by a first value based on the signal information, and adjusting the measurement of a second sensor of the plurality of sensors by a second value based on the signal information.

In some configurations, the first value is based on an expected signal strength-range curve, and the expected signal strength-range curve represents a plurality of measurements at corresponding ranges in response to an absence of the reflective element.

In some configurations, adjusting the measurement of the first sensor of the plurality of sensors by the first value further comprises offsetting the measurement of the first sensor by a constant value.

In some configurations, the method further comprises adjusting the RSSI measurement of the first sensor of the plurality of sensors by a first value based on the signal information and in response to the measurement being below a first RSSI measurement threshold.

In some configurations, the method further comprises adjusting the RSSI measurement of the first sensor of the plurality of sensors by a second value based on the signal information and in response to the measurement being above the first measurement threshold.

In some configurations, determining whether the user device is within the threshold distance of the vehicle is based on GPS information of the user device.

In some configurations, the control module determines that the user device is within the threshold distance of the vehicle in response to the user device being connected to the communication gateway.

In some configurations, the ping signal is a Bluetooth signal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure relates to systems, methods, and architecture to implement a localization system, such as a PEPS system, using a consumer grade wireless protocol, such as, for example, a consumer grade wireless protocol based on the standardized specification of the Bluetooth Consortium. Specifically, the present disclosure relates to a PEPS system using a Bluetooth Low Energy (BLE) communication protocol for communication between the vehicle and BLE-enabled user devices, such as a smartphone or a wearable device. Specifically, the PEPS system includes a sensor network that is configured to find existing connections between user devices and the vehicle and to measure the timing and signal characteristics of the communication between the user devices and the vehicle. Alternatively, while the present disclosure describes establishing a wireless communication connection using Bluetooth or BLE, the systems and methods described herein could be used with other wireless communication protocols, such as Wi-Fi, Wi-Fi direct, ultra-wide band (UWB) communication, and/or impulse-radio (IR) UWB communication.

Furthermore, the PEPS system is also configured to measure the timing and signal characteristics of a ping signal transmitted by the sensor network and/or a beacon of the vehicle. In response to the control module instructing the sensor network and/or the beacon to broadcast the ping signal and the ping signal being reflected back toward the sensor network, the sensor network measures the timing and signal characteristics of the reflected ping signal, such as received signal strengths, and then provides the timing and signal characteristics to the control module. Subsequently, the control module may determine the presence or absence of a reflective element near the vehicle based on the timing and signal characteristics of the reflected ping signal. If the control module determines that a reflective element is located near the vehicle, the control module may perform a calibration function to ensure that the PEPS system is able to accurately measure the timing and signal characteristics of the communication between the user devices and the vehicle.

Figure 1:
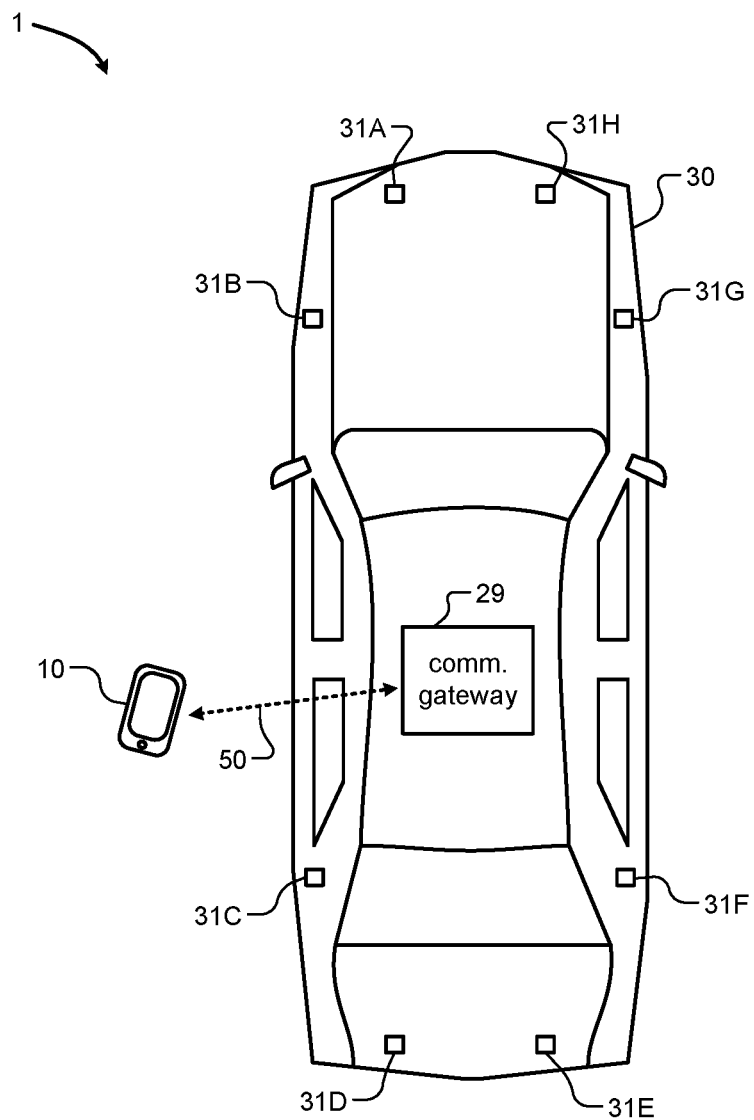
FIG. 1 illustrates a subject vehicle with a PEPS system according to the present disclosure.
Figure 2:
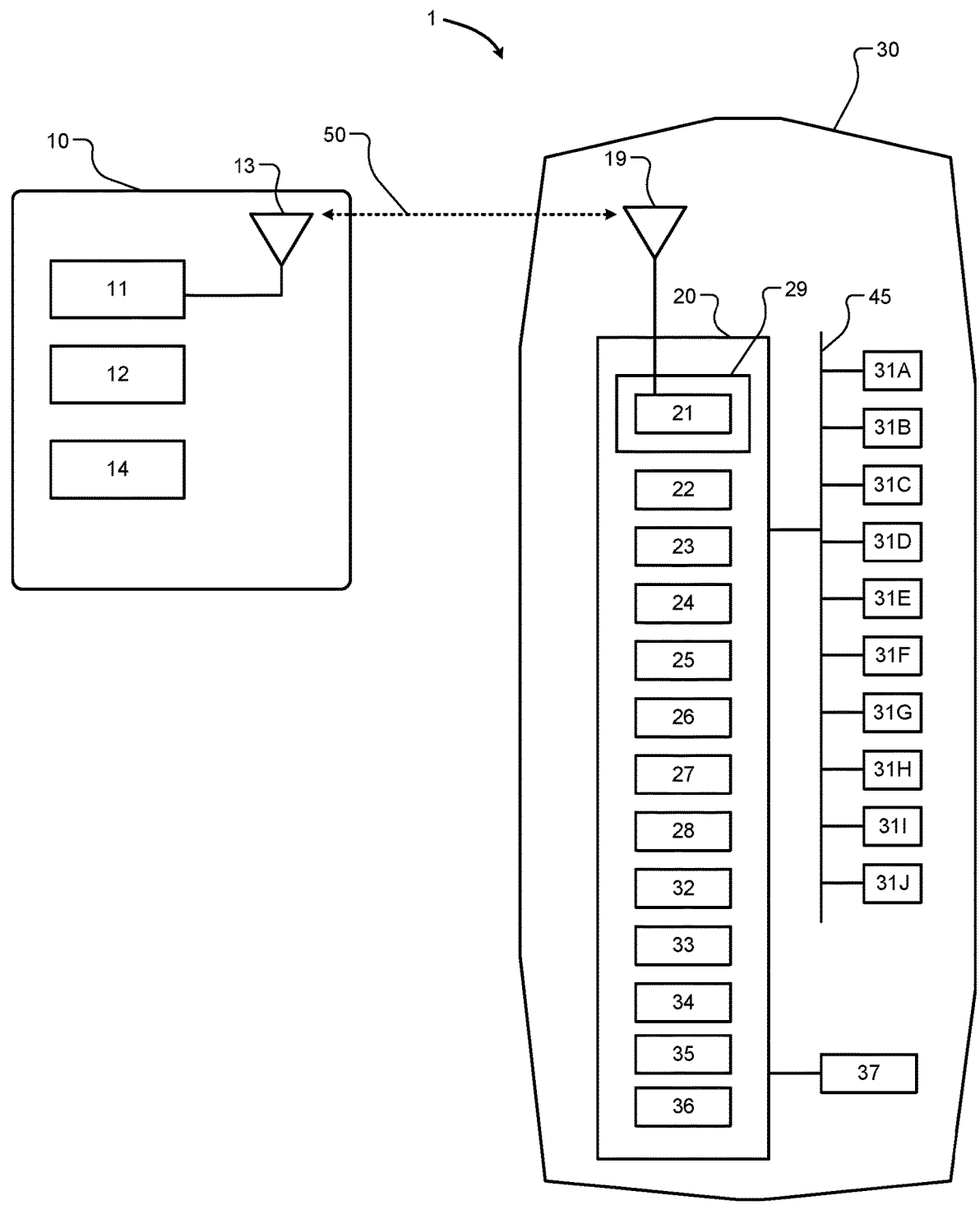
FIG. 2 illustrates a block diagram for a PEPS system according to the present disclosure.

With reference to FIGS. 1 and 2, a PEPS system 1, which may also be referred to as a localization system, is provided within a vehicle 30 and includes a communication gateway 29, a plurality of sensors 31A-31H, referred to collectively as sensors 31. The PEPS system 1 includes one or more control modules 20 that are distributed throughout the vehicle 30 and are able to communicate with each other through, for example, a vehicle interface 45. In addition, some of the modules may be integrated into a single electronic control unit (ECU) or are able to communicate with each other using the vehicle interface 45. The vehicle interface 45, for example, may include a controller area network (CAN) bus for communication between main modules and/or lower data rate communication such as local interconnect network (LIN) for communication between the sensors 31. The vehicle interface 45 can also include a clock extension peripheral interface (CXPI) bus. Additionally or alternatively, the vehicle interface 45 can include a combination of CAN bus, LIN, and CXPI bus communication interfaces. The structure of the sensors 31 are discussed in further detail below with reference to FIG. 3.

The control module 20 can include, for example, the communication gateway 29 that includes a BLE chipset 21 connected to an antenna 19. As shown in FIG. 2, the antenna 19 may be located in the vehicle 30. Alternatively, the antenna 19 may be located outside of the vehicle 30 or within the control module 20. The control module 20 can also include a link authentication module 22 that authenticates a user device 10 for communication via a communication link 50. The control module 20 can also include a data management layer 23 for push data. The control module 20 can also include a connection information distribution module 24. The control module 20 can also include a timing control module 25. The control module 20 can also include a telematics module 26, such as a global positioning system (GPS) module and/or other navigation or location modules. The control module 20 can also include a PEPS module 27. The control module 20 can also include a body control module 28. The control module 20 can also include a sensor processing and localization module 32. The control module 20 can also include a security filtering module 33.

The control module 20 can also include a sensor calibration module 34, a signal strength-range curve database 35, and a vehicle function activation module 36, each of which are described below in further detail with reference to FIGS. 5A-5B, FIGS. 6A-6B, and FIG. 7. The control module 20 may also include one or more processors that are configured to execute instructions stored in a nontransitory memory, such as a read-only memory (ROM) and/or random access memory (RAM). Additionally, the signal strength-range curve database 35 may be implemented by the nontransitory memory.

The control module 20 may also be in communication with a beacon 37 that is configured to transmit ping signals, as described below in further detail with reference to FIGS. 6A-6B and FIG. 7. In other embodiments, the control module 20 may include the beacon 37.

As shown in FIGS. 1 and 2, the user device 10 can communicate with the communication gateway 29 of the vehicle 30 via the communication link 50. Without limitation, the user device 10 may be any Bluetooth enabled communication device, such as a smart phone, smart watch, wearable electronic device, key fob, tablet device, or other device associated with a user of the vehicle 30, such as an owner, driver, passenger of the vehicle 30, and/or a technician for the vehicle 30. As noted above, other wireless communication protocols could be used in place of Bluetooth or BLE, such as Wi-Fi, Wi-Fi direct, UWB, and/or IR USB. The user device 10 can include a BLE chipset 11 connected to an antenna 13. The user device 10 can also include application software 12 stored in a computer-readable storage module or device, such as a read-only memory (ROM) or a random-access memory (RAM). Further, the application software 12 includes instructions that are executable by a processor of the user device 10. The user device 10 can also include a GPS module 14 or other device location service.

The user device 10 and the communication gateway 29 can establish the communication link 50 using a Bluetooth communication link, as provided for and defined by the Bluetooth specification. For example, the communication link 50 between the user device 10 and the communication gateway 29 can be a BLE communication link. Alternatively, as noted above, a Wi-Fi, Wi-Fi direct, UWB, and/or IR UWB communication link may be used in place of the BLE communication link.

The PEPS system 1 may be configured to provide additional authentication of the communication link 50 with the user device. For example, the communication gateway 29 can communicate with the link authentication module 22 to authenticate the user device 10 and establish the communication link 50. For example, the link authentication module 22 can be configured to implement challenge-response authentication. In such case, timing information about the communication between the communication gateway 29 and the user device 10 is sent to the timing control module 25, which communicates with the sensors 31 through the vehicle interface 45, as described below. Further, the communication gateway 29 can communicate information about communication channels and channel switching parameters to the connection information distribution module 24. The connection information distribution module 24 is configured to communicate with each of the sensors 31 using the vehicle interface 45 and to provide the sensors 31 with communication information necessary for the sensors 31 to find and then follow the communication link 50 once the sensors 31 are synchronized with the communication gateway 29.

While FIGS. 1 and 2 illustrate a PEPS system 1 with eight sensors 31A-31H, any number of sensors can be used. For example, the PEPS system can include six, seven, nine, ten, eleven, or more sensors. In this way, while the present disclosure provides an example utilizing eight sensors, additional or fewer sensors can be used in accordance with the present disclosure.

Figure 3:
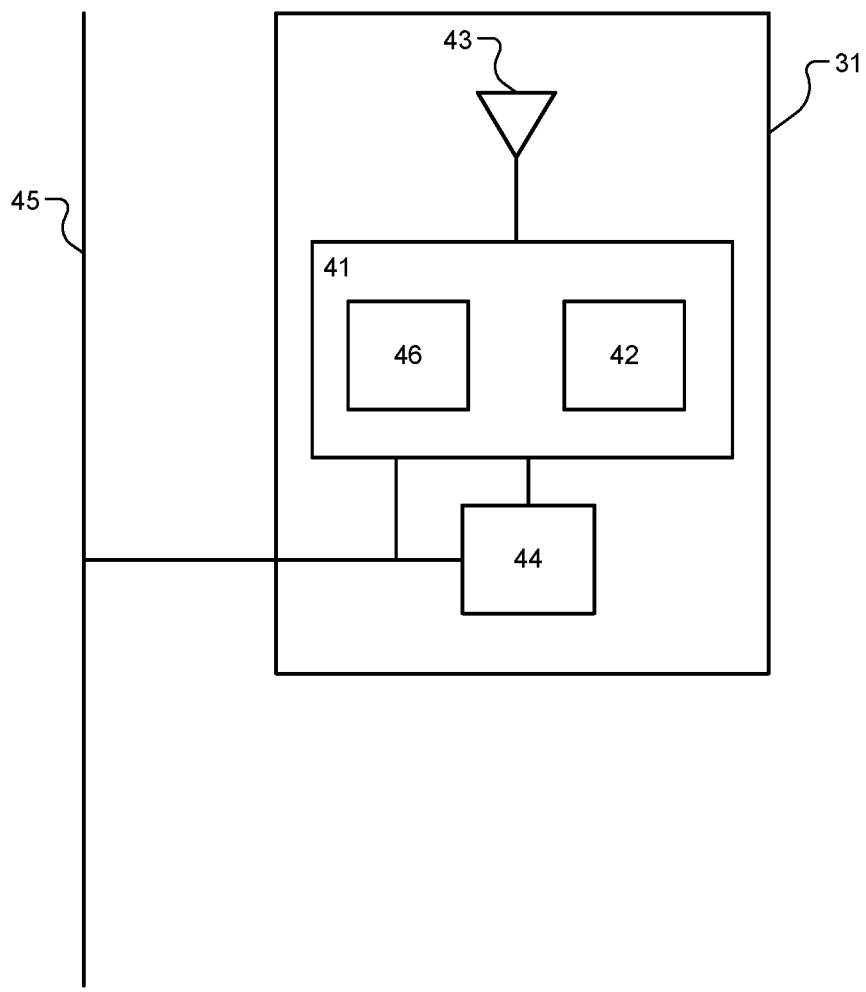
FIG. 3 illustrates a block diagram for a sensor of a PEPS system according to the present disclosure.

With reference to FIG. 3, each of the sensors 31 includes a BLE chipset 41 connected to an antenna 43. As shown in FIG. 3, the antenna 43 may be located internal to the sensors 31. Alternatively, the antenna 43 may be located external to the sensors 31. The sensors 31 receive BLE Signals using the antenna 43 and, specifically, receive BLE physical layer messages using a BLE physical layer (PHY) controller 46. The sensors 31 are capable of observing BLE physical layer messages and taking measurements of the physical properties of the associated signals, including, for example, the received signal strength (RSSI) using a channel map that is produced by a channel map reconstruction module 42. Additionally or alternatively, the sensors 31 can determine other measurements of the physical properties of the associated signals, including, for example, data related to the angle of arrival. Additionally or alternatively, the sensors 31 can communicate with each other and/or communicate with the communication gateway 29 via the vehicle interface 45 to determine time difference of arrival, time of arrival, or angle of arrival data for signals received by multiple sensors. Additionally or alternatively, the sensors 31 can measure and determine round trip time of flight information about signals sent and received to and from the user device 10. The sensors 31 receive timing information and channel map information from the communication gateway 29 via the vehicle interface 45. A timing synchronization module 44 is configured to accurately measure the reception times of messages on the vehicle interface 45 and pass the timing information to the BLE chipset 41. The BLE chipset 41 is configured to take the channel map information and the timing signals and to tune the PHY controller 46 to a specific channel at a specific time and observe all physical layer messages and data that conform to the Bluetooth physical layer specification, which includes the normal data rates proposed or adopted, for example, in the Bluetooth Specification version 5.0. The data, timestamps and measured signal strength are reported by the BLE chipset 41 to the communication gateway 29, or other control module 20, of the vehicle 30 via the vehicle Interface 45. Additionally or alternatively, the sensors 31 may transmit the ping signal generated by the control module 20 via the vehicle interface 45 and the antenna 43.

Figure 4:
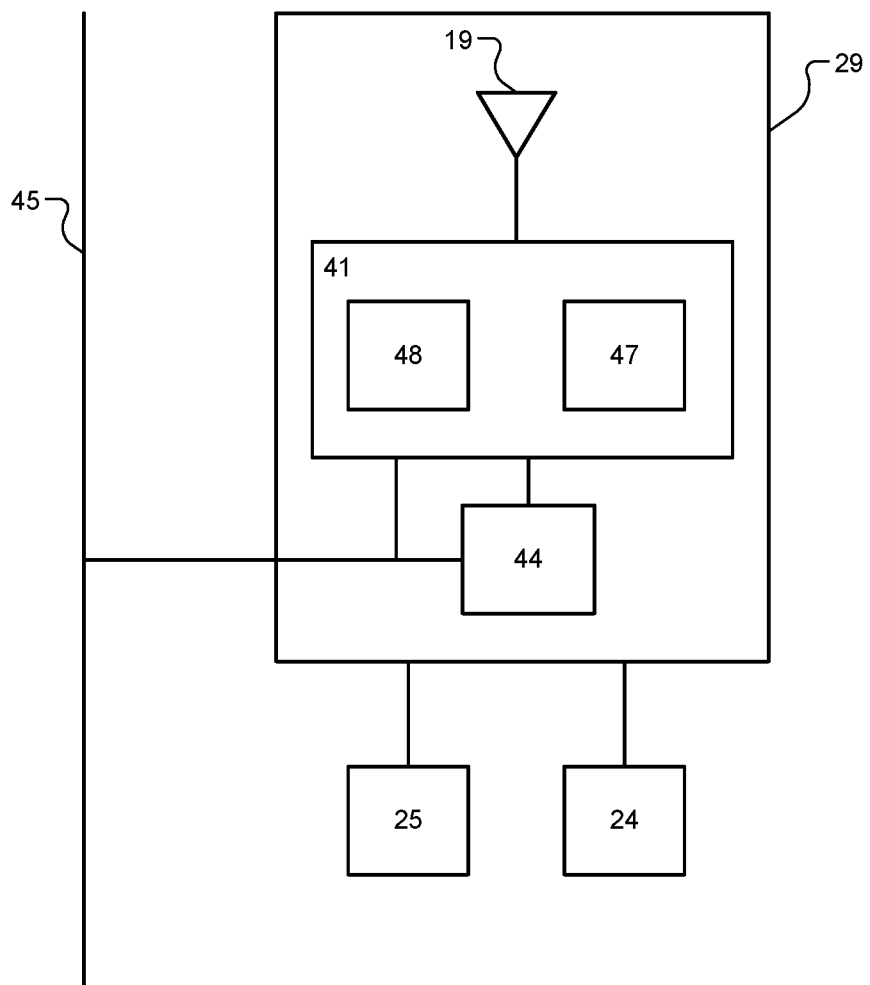
FIG. 4 illustrates a communication gateway of a PEPS system according to the present disclosure.

With reference to FIG. 4, the communication gateway 29 includes a BLE chipset 41 connected to an antenna 19 to receive BLE Signals. The BLE chipset 41 implements a Bluetooth protocol stack 48 that is, for example, compliant with the BLE specification, including, for example, version 5 of the BLE specification. The BLE chipset 41 also includes an application 47 implemented by application code stored in a computer-readable medium, such as a read-only memory (ROM) or a random-access memory (RAM). Further, the application 47 includes instructions that are executable by a processor of the BLE chipset 41. The application 47 may include modifications outside of the Bluetooth specification to enable the BLE chipset 41 to inspect timestamped data transmitted and received by the BLE chipset 41, regardless of the validity of the data. For example, the application 47 enables the BLE chipset 41 to compare transmitted and received data against expectations. The communication gateway 29 is configured to transmit the actual transmitted and received data to vehicle systems of the vehicle 30 via the vehicle interface 45. Alternatively, the communication gateway 29 can be configured to receive the data from each of the sensors 31 via the vehicle interface 45. The application 47 can be further configured to enable the BLE chipset 41 to confirm that each of the sensors 31 has received the correct data at the correct time.

With continued reference to FIG. 4, the communication gateway 29 is further configured to provide information about ongoing connections and timing signals necessary for each of the sensors 31 to find the connection being maintained by the communication gateway 29 with the user device 10, for example, and to subsequently follow the connection. The Bluetooth protocol stack 48 is configured to provide the channel map, access identifier, next channel, and the time to the next channel to the application 47. The Bluetooth protocol stack 48 is configured to output timing signals for the timestamps of transmission and reception events to the application 47 and/or a digital PIN output of the BLE chipset 41. The communication gateway 29 also includes a timing synchronization module 44. The timing synchronization module 44 is configured to accept the timing signals and works in conjunction with the vehicle interface 45 to create accurate time stamps of connection information messages and other communications.

Figure 5A:
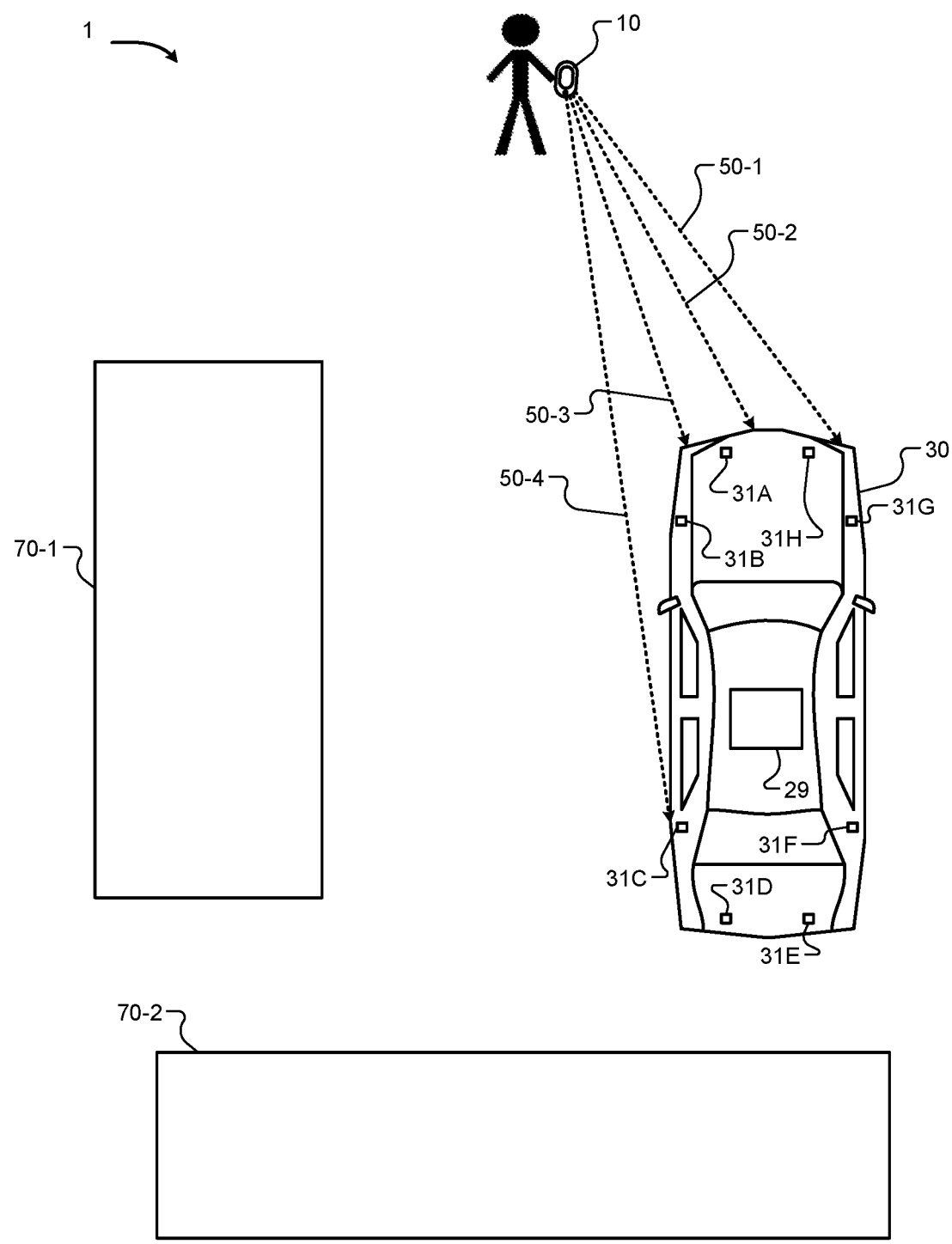
FIGS. 5A-5B illustrate a subject vehicle with a PEPS system and a plurality of reflective elements according to the present disclosure.
Figure 5B:
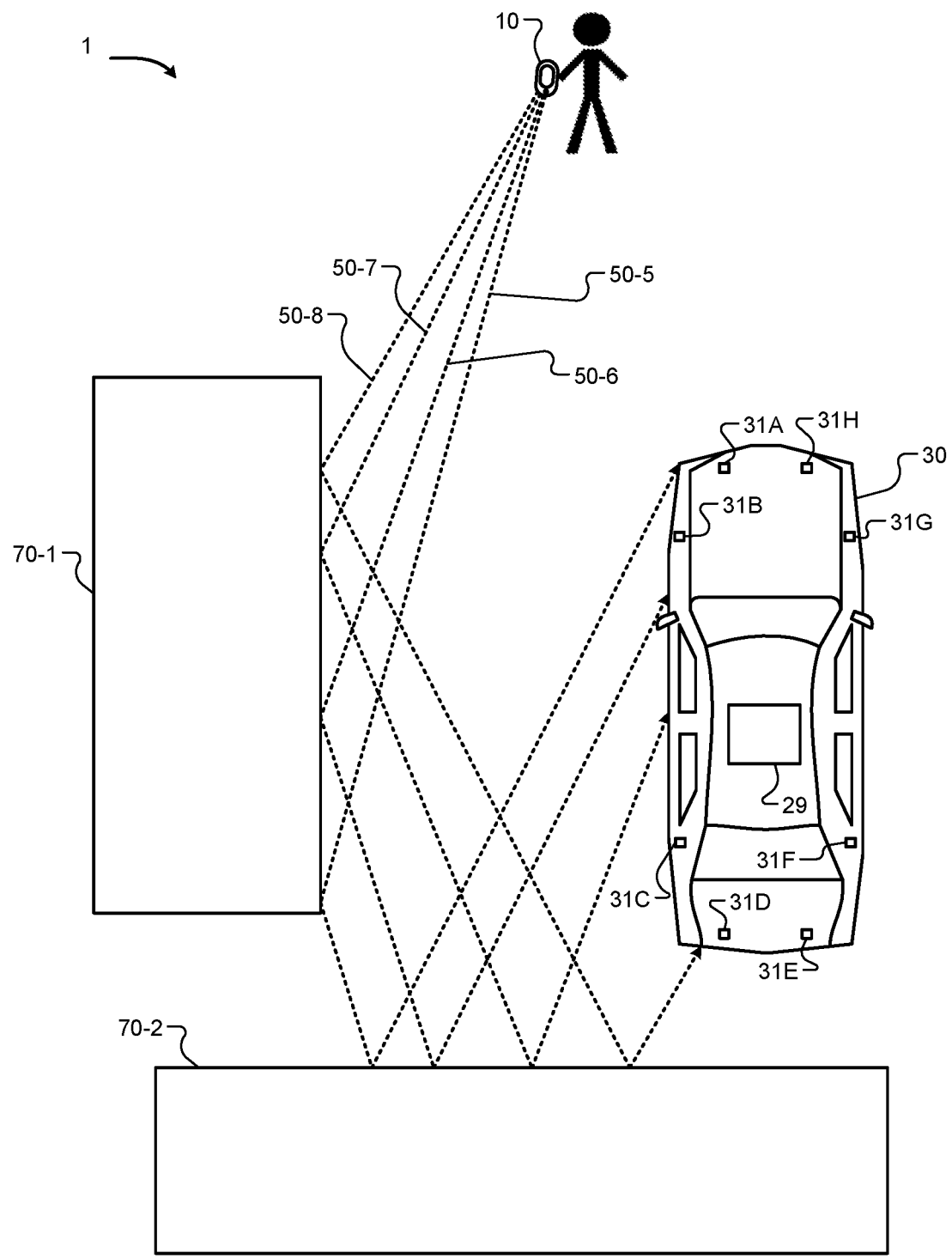

With reference to FIGS. 5A-5B, the PEPS system 1 is provided within the vehicle 30 and includes the communication gateway 29 and the sensors 31. As described above, the sensors 31 are configured to take measurements of the physical properties of the BLE signal transmitted by the user device 10 to the communication gateway 29 via the communication link 50. The sensors 31 may measure, for example, the RSSI of the BLE signal and data related to the angle of arrival of the communication link 50. Additionally, the sensors 31 may be configured to determine the time difference of arrival, time of arrival, angle of arrival, and/or round trip time of flight data of the BLE signal. Using the physical properties and/or data of the BLE signal, the communication gateway 29 may then determine a distance between the user device 10 and the vehicle 30.

As an example, in response to the communication gateway 29 being connected to the user device 10 via the communication link 50, the communication gateway 29 may provide the sensors 31 data corresponding to the BLE signal transmitted by the user device 10. In response to the data corresponding to the BLE signal provided by the communication gateway 29 matching the data corresponding to a BLE signal acquired by the sensors 31 from the user device 10 (e.g., a BLE communication packet received by the sensors 31 from the communication gateway 29 matches the BLE communication packet received by the sensors 31 from the user device 10), the sensors 31 are configured to generate RSSI measurements of the BLE signal. As noted above, additionally or alternatively, the sensors 31 can generate angle of arrival (AoA) and/or round trip time of flight measurements of the BLE signal. As further noted above, another wireless protocol, such as Wi-Fi, Wi-Fi direct, UWB, or IR_UWB, could be used instead of BLE.

The sensors 31 may provide the measurements, such as the RSSI, AoA, or round trip time of flight measurements, to the control module 20. In response to the control module 20 receiving the measurements from the sensors 31, the control module 20 may determine the location of the user device 10, the distance between the user device 10 and the vehicle 30, and/or trajectory of the user device 10 based on the measurements received from the sensors 31. In other embodiments, the communication gateway 29 may receive the measurements from the sensors 31 and determine the location of the user device 10, the distance between the user device 10 and the vehicle 30, and/or trajectory of the user device 10 based on the measurements received from the sensors 31.

Furthermore, as shown in FIGS. 5A-5B, the user device 10 may transmit a BLE signal to the control module 20 via the communication gateway 29. The communication link 50 is represented by communication link portions 50-1-50-8. As shown in FIG. 5A, communication link portions 50-1-50-4 may be received by the sensors 31 without any distortion to the portion of respective portion of the communication link. However, as shown in FIG. 5B, some of the communication link portions, such as communication link portions 50-5-50-8, may be distorted and/or reflected by reflective element 70-1 and/or reflective element 70-2 (collectively referred to as reflective elements 70). The reflective elements 70 may be any object that is configured to reflect the communication link 50, and may be any object that includes metal and other conductive materials, such as a vehicle, buildings, etc.

As a result of the reflection and/or distortion caused by the reflective elements 70, the measurements of the sensors 31, such as the RSSI, AoA, or round trip time of flight measurements, may not accurately represent the location of the user device 10 with respect to the vehicle 30. As an example, without the reflective elements 70, communication link portions 50-5-50-8 may not be detected by the sensors 31. However, the reflective elements 70 may cause communication link portions 50-5-50-8 to be reflected toward the vehicle 30, thereby causing the sensors 31 to generate larger RSSI measurement values, for example, at sensors 31A-31D. Accordingly, the control module 20 may determine that the user device 10 is closer to the vehicle 30 than the actual location of the user device 10.

Moreover, the vehicle function activation module 36 may activate certain vehicle functions based on an improperly determined distance of the user device 10 with respect to the vehicle 30. The vehicle functions may include, for example, unlocking a trunk of the vehicle 30, starting the vehicle 30, and activating a heating system or an air conditioning system of the vehicle 30. Additionally, activating vehicle functions may include activating a lighting system of the vehicle 30 and unlocking a door of the vehicle 30.

Figure 6A:
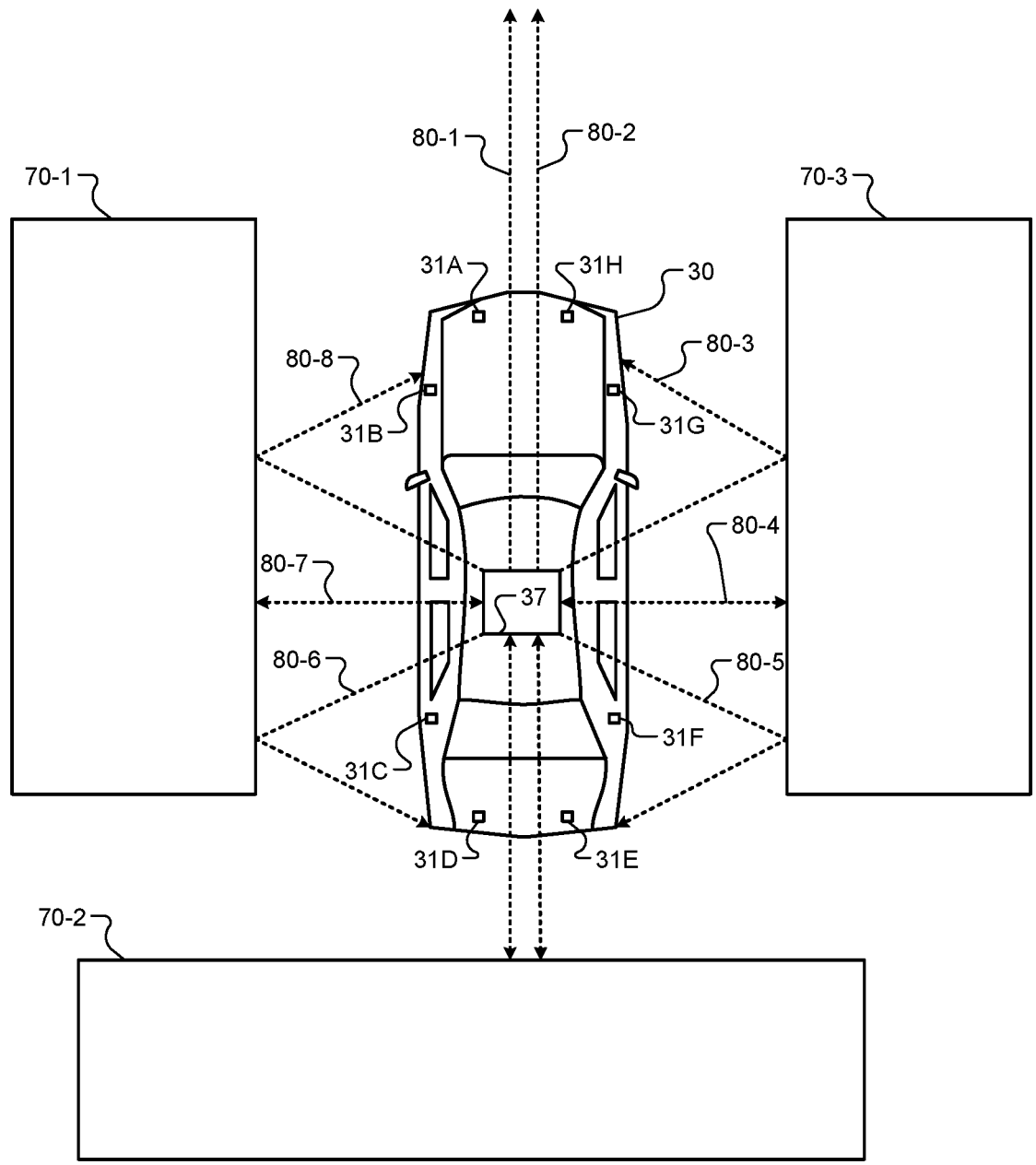
FIGS. 6A-6B illustrate an example embodiment of a subject vehicle with a PEPS system and a plurality of reflective elements according to the present disclosure.
Figure 6B:
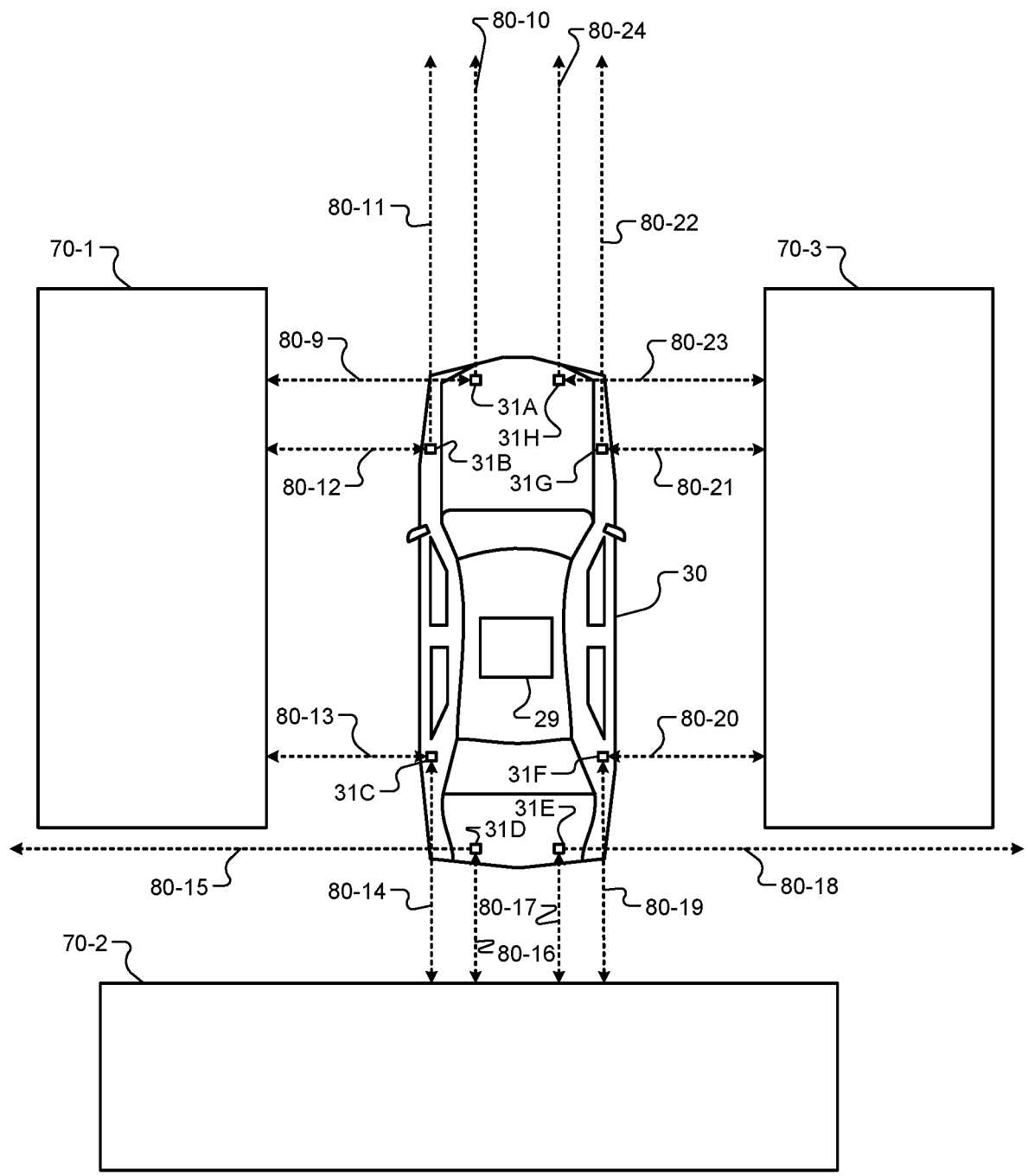

With reference to FIGS. 6A-6B, the PEPS system 1 is provided within the vehicle 30 and includes the communication gateway 29 and the sensors 31. In this embodiment, in order to correct the measurements caused by the reflective elements 70, the control module 20 may instruct the beacon 37 to broadcast a ping signal 80. As shown in FIG. 6A, the ping signal 80 is represented by ping signal portions 80-1-80-8. Additionally or alternatively and as shown in FIG. 6B, the sensors 31 broadcast the ping signal 80, and the ping signal 80 is represented by ping signal portions 80-9-80-24.

The ping signal 80 may be any telemetric signal that is detectable and measurable by the sensors 31. As an example, the ping signal 80 may be a BLE signal. As another example, the ping signal 80 may be a Wi-Fi, Wi-Fi direct, UWB, or IR-UWB signal. In other embodiments, the ping signal may be a low frequency (LF) signal, a high frequency (HF) signal, or an ultra-high frequency (UHF) signal.

The ping signal 80 may be broadcasted by the beacon 37 and/or sensors 31 when the user device 10 is located within a threshold distance of vehicle 30. As an example, the threshold distance may be located outside of a communication range of the communication link 50. Accordingly, the control module 20 may acquire GPS location data of user device 10 to determine whether the user device 10 is within threshold distance. Alternatively, the threshold distance may be located within the communication range of the communication link 50 and, therefore, the ping signal 80 may be broadcasted when the communication link 50 is established between user device 10 and the communication gateway 29.

In one embodiment, certain ping signal portions are reflected toward the vehicle 30 by one of the reflective elements 70 and, therefore, the sensors 31 may be configured to measure an RSSI, an AoA, and/or a round trip time of flight of the reflected ping signal portions. As shown in FIG. 6A, the sensors 31 may be able to detect and measure an RSSI, an AoA, and/or a round trip time of flight of the reflected ping signal portions 80-3-80-8. Accordingly, the sensors may not be able to detect and measure an RSSI, an AoA, and/or a round trip time of flight of ping signal portions 80-1 and 80-2, which are not reflected and/or distorted by one of the reflective elements 70. Likewise, as shown in FIG. 6B, the sensors 31 may be able to detect and measure an RSSI, an AoA, and/or a round trip time of flight of the reflected ping signal portions 80-9, 80-12-80-14, 80-16-80-17, 80-19-80-21, and 80-23. Moreover, the sensors 31 may not be able to detect and measure an RSSI, an AoA, and/or a round trip time of flight of ping signal portions 80-10-80-11, 80-15, 80-18, 80-22, and 80-24, which are not reflected and/or distorted by one of the reflective elements 70.

The sensors 31 may then provide the measurements of the reflected ping signal portions to the control module 20. Subsequently, the control module 20 and/or the sensor calibration module 34 may determine the presence and/or location of the reflective elements 70 based on the measurements. As an example, the control module 20 may determine the presence and/or location of reflective element 70-1 based on the measurements generated by sensor 31A, sensor 31B, sensor 31C, and/or sensor 31D. Additionally, the control module 20 may determine the presence and/or location of reflective element 70-2 based on the measurements generated by sensor 31C, sensor 31D, sensor 31E, and/or sensor 31F. Furthermore, the control module may determine the presence and/or location of reflective element 70-3 based on the measurements generated by sensor 31E, sensor 31F, sensor 31G, and sensor 31H.

In response to determining the presence and/or location of the reflective elements 70, the sensor calibration module 34 may adjust measurements of the communication link 50 in order to match the measurements to signal strength-range curves for each of the corresponding sensors 31. The signal strength-range curve represents a plurality of expected measurements at various distances with respect to the corresponding sensor when no reflective elements 70 are located within a sensing range of the corresponding sensor. As an example, the signal strength-range curve for sensor 31A may indicate a first measurement if the user device 10 is 5 meters away, and the signal strength-range curve may indicate a second measurement if the user device 10 is 2 meters away, wherein the second measurement is greater than the first measurement. As such, when the control module 20 receives a measurement from one of the sensors 31, the control module 20 may reference the signal-strength range curve for at least one of the sensors 31 in order to determine the location of the user device 10.

As described above, the presence of the reflective elements 70 may cause the sensors 31 to report higher measurements than the corresponding distance. As an example, reflective element 70-1 may cause sensor 31A to report a measurement that is greater than the first measurement if the user device 10 is 5 meters away, as indicated by the signal strength-range curve for sensor 31A. Accordingly, the control module 20 may incorrectly determine that the user device 10 is, for example, 3 meters away from the sensor 31A when it is actually located 5 meters away from the sensor 31A.

Therefore, in order to match the measurements of the signal strength-range curve for the corresponding sensors 31, the sensor calibration module 34 may adjust measurements of the communication link 50 based on the measurements of the reflected ping signal portions. As an example, the sensor calibration module 34 may offset each measurement of the communication link 50 obtained by sensor 31A by a constant value such that it corresponds with the signal strength-range curve for sensor 31A, thereby enabling the control module 20 to accurately determine the location of the user device 10. As another example, the sensor calibration module 34 may offset each measurement of the communication link 50 obtained by each of the sensors 31 by a value such that the measurements obtained by each sensor correspond with the signal strength-range curve for each of the sensors 31. Furthermore, the sensor calibration module 34 may offset measurements of the communication link 50 obtained by a first sensor of the sensors 31 by a first value and a second sensor of the sensors 31 by a second value, such that the measurements obtained by the first sensor and the second sensor correspond with the signal strength-range curve of the first sensor and second sensor, respectively.

In one embodiment, the sensor calibration module 34 may offset the measurements obtained by one of the sensors 31 by different values. As an example, the sensor calibration module 34 may offset each measurement of sensor 31A by a first value if the measurement is below a first measurement threshold. Furthermore, if the measurement is above the first measurement threshold, the sensor calibration module 34 may offset each measurement of sensor 31A by a second value. As such, the control module 20 is able to accurately determine the location of the user device 10.

Alternatively, in response to determining the presence and/or location of the reflective elements 70, the sensor calibration module 34 may adjust a signal strength-range curve of a corresponding sensor that is stored in the signal strength-range curve database 35, thereby enabling the measurements of the communication link 50 to match the measurements of the signal strength-range curves for the corresponding sensor. As an example, the sensor calibration module 34 may adjust the expected values of each of the signal strength-range curves by a first value based on the presence and/or location of the reflective elements 70. Alternatively, the sensor calibration module 34 may adjust the expected values of a signal strength-range curve corresponding to sensor 31A by a first value and the expected values of a signal strength-range curve corresponding to sensor 31B by a second value based on the presence and/or location of the reflective elements 70. As another example, the sensor calibration module 34 may adjust the expected values of a signal strength-range curve corresponding to sensor 31C by a first value for expected measurements below a first measurement threshold. Furthermore, the sensor calibration module 34 may adjust the expected values of the signal strength-range curve corresponding to sensor 31C by a second value for expected measurements above the first measurement threshold.

Figure 7:
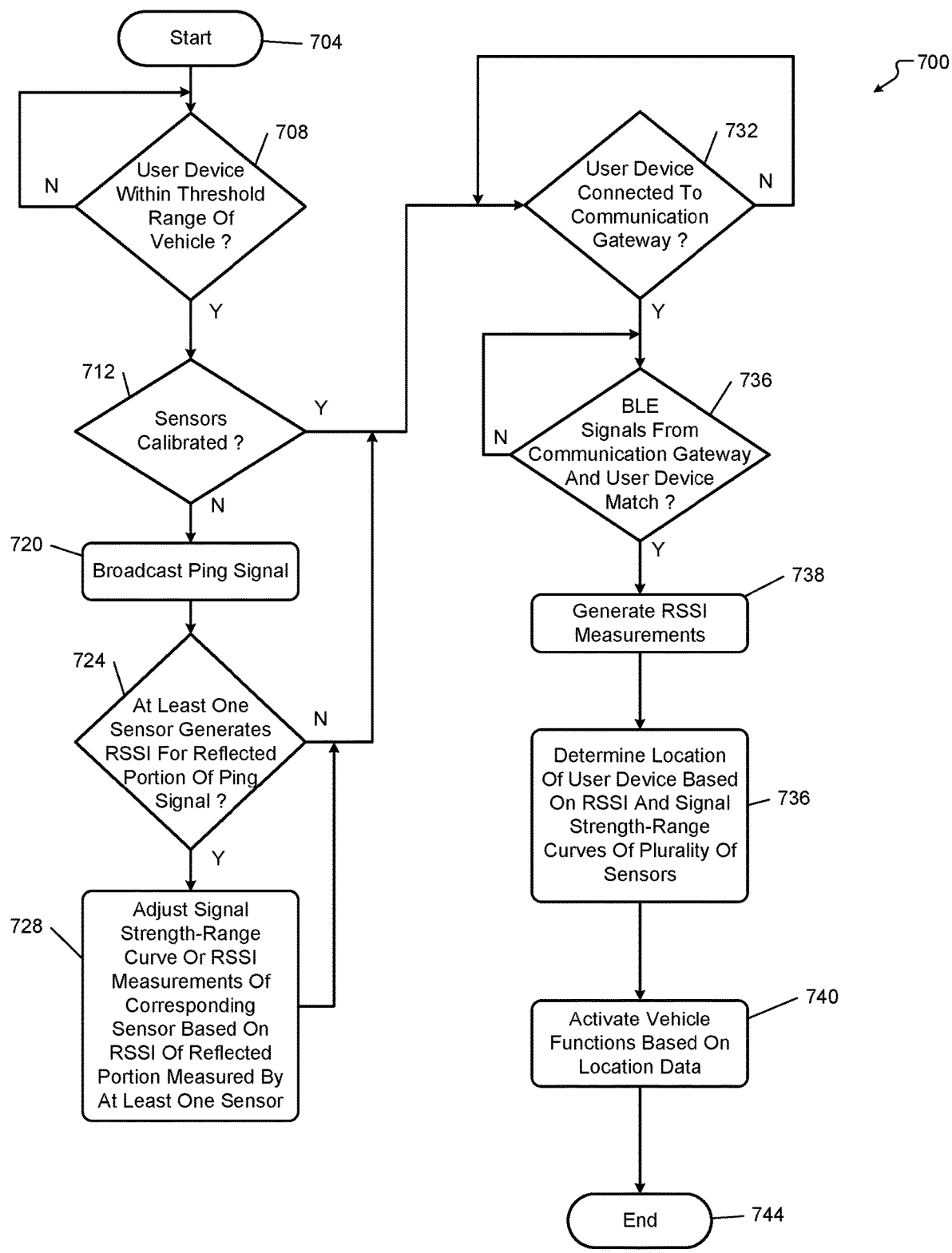
FIG. 7 illustrates a flowchart of an example algorithm for calibrating a plurality of sensors and activating vehicle functions according to the present disclosure.

With reference to FIG. 7, illustrates a flowchart of an example control algorithm 700 for calibrating a plurality of sensors and activating vehicle functions. The control algorithm 700 begins at 704 when, for example, the user device 10 is turned on. At 708, the control algorithm 700 determines, using the control module 20, whether the user device 10 is within the threshold range of the vehicle 30. As described above, the control module 20 may determine that the user device 10 may be within the threshold range based on GPS information of the user device 10 or in response to the user device 10 communicating with the control module 20 via the communication gateway 29. If the user device 10 is located within the threshold range, the control algorithm 700 proceeds to 712; otherwise, the control algorithm 700 remains at 708 until the user device 10 is located within the threshold range.

At 712, the control algorithm 700 determines, using the control module 20, whether the sensors 31 are calibrated. In other words, the control algorithm 700 determines whether the beacon 37 and/or sensors 31 have transmitted the ping signal 80. If so, the control algorithm 700 proceeds to 732; otherwise, the control algorithm 700 proceeds to 720. At 720, the control algorithm 700 broadcasts, using the beacon 37 and/or the sensors 31, the ping signal 80. At 724, the control algorithm 700 determines whether at least one of the sensors 31 generates a measurement, such as an RSSI, AoA, and/or time of flight measurement, for a reflected portion of the ping signal 80. If so, the control algorithm 700 proceeds to 728; otherwise, the control algorithm 700 proceeds to 736. At 728, the control algorithm 700 adjusts, using the sensor calibration module 34, the signal strength-range curve or the measurements of the corresponding at least one sensor based on the of the reflected portion of ping signal measured by the at least one sensor. As such, the control module 20 may subsequently be able to accurately determine the location of the user device 10 when the vehicle 30 and/or user device 10 are located near reflective elements 70.

At 732, the control algorithm 700 determines whether the user device 10 is connected to the communication gateway 29. If so, the control algorithm 700 proceeds to 736; otherwise, the control algorithm 700 remains at 732 until the user device 10 is connected to the communication gateway 29. At 736, the control algorithm 700 determines whether the BLE signal received by the sensors 31 from the communication gateway 29 matches the BLE signal received by the sensors from the user device 10. If so, the control algorithm 700 proceeds to 738; otherwise, the control algorithm 700 remains at 736 until the BLE signal received by the sensors 31 from the communication gateway 29 matches the BLE signal received by the sensors from the user device 10. At 738, the control algorithm 700 generates, using the sensors 31, measurements based on the BLE signal.

At 740, the control algorithm 700 determines, using the control module 20, the location of the user device 10 based on the measurements and the signal strength-range curves of the sensors 31. At 748, the control algorithm 700 activates, using the vehicle function activation module 35, a vehicle function based on the location data. As an example, if the user device 10 is within 8 meters of the vehicle 30, the vehicle function activation module 35 may unlock a trunk of the vehicle 30, start the vehicle 30, and activate a heating system or an air conditioning system of the vehicle 30. Additionally, the vehicle function activation module 35 may activate a lighting system of the vehicle 30 and unlock a door of the vehicle 30 if the user device 10 is within, for example, 4 meters of the vehicle 30. The control algorithm 700 then proceeds to 752 and ends.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP:Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A system comprising:
 a control module of a vehicle, wherein the control module is configured to instruct at least one of a beacon and a plurality of sensors to broadcast a ping signal in response to a user device being within a threshold distance of the vehicle, and the control module includes at least one processor that is configured to execute instructions stored in a nontransitory memory;
 the plurality of sensors are configured to communicate signal information to the control module, wherein the signal information indicates an amount of reflection of the ping signal measured by the plurality of sensors; and a sensor calibration module that is implemented by the at least one processor of the control module, wherein the sensor calibration module is configured to (i) determine a presence of a reflective element based on the signal information, and (ii) in response to determining the presence of the reflective element and the user device being connected to a communication gateway of the control module, adjust a measurement of a first sensor of the plurality of sensors by a first value based on the signal information, the first value being based on an expected signal strength-range curve that represents a plurality of measurements at corresponding ranges in response to an absence of the reflective element.

2. The system of claim 1, wherein the sensor calibration module is configured to, in response to determining the presence of the reflective element and the user device being connected to the communication gateway, adjust the measurement of each sensor of the plurality of sensors based on the signal information.

3. The system of claim 2, wherein the measurement of the first sensor of the plurality of sensors includes at least one of a received signal strength, an angle of arrival, and a time of flight, and the measurement of a second sensor of the plurality of sensors is adjusted by a second value based on the signal information.

4. The system of claim 2, wherein the measurement of the first sensor of the plurality of sensors is adjusted by the first value based on the signal information and in response to the measurement being below a first measurement threshold.

5. The system of claim 4, wherein the measurement of the first sensor of the plurality of sensors is adjusted by a second value based on the signal information and in response to the measurement being above the first measurement threshold.

6. The system of claim 1, wherein the control module determines that the user device is within the threshold distance of the vehicle based on Global Positioning System (GPS) information of the user device.

7. The system of claim 1, wherein the control module determines that the user device is within the threshold distance of the vehicle in response to the user device being connected to the communication gateway.

8. The system of claim 1, wherein the ping signal is a Bluetooth signal.

9. A method comprising:
determining, using a control module that includes at least one processor that is configured to execute instructions stored in a nontransitory memory, whether a user device is within a threshold distance of a vehicle;
generating, using the control module and in response to the user device being within the threshold distance of the vehicle, a command for at least one of a beacon and a plurality of sensors to broadcast a ping signal;
broadcasting, in response to receiving the command from the control module, the ping signal;
communicating, using the plurality of sensors, signal information to the control module, wherein the signal information indicates an amount of reflection of the ping signal measured by the plurality of sensors; and
determining, using a sensor calibration module that is implemented by the at least one processor of the control module, a presence of a reflective element based on the signal information;
determining, using the control module, whether the user device is connected to a communication gateway of the control module; and
adjusting, using the sensor calibration module and in response to (i) determining the presence of the reflective element and (ii) the user device being connected to the communication gateway of the control module, a measurement of a first sensor of the plurality of sensors by a first value based on the signal information, the first value being based on an expected signal strength-range curve that represents a plurality of measurements at corresponding ranges in response to an absence of the reflective element.

10. The method of claim 9, further comprising adjusting, using the sensor calibration module and in response to (i) determining the presence of the reflective element and (ii) the user device being connected to the communication gateway, the measurement of each sensor of the plurality of sensors based on the signal information.

11. The method of claim 10, wherein the measurement of the first sensor includes at least one of a received signal strength, an angle of arrival, and a time of flight, the method further comprising:
adjusting the measurement of a second sensor of the plurality of sensors by a second value based on the signal information.

12. The method of claim 10, further comprising adjusting the measurement of the first sensor of the plurality of sensors by the first value based on the signal information and in response to the measurement being below a first measurement threshold.

13. The method of claim 12, further comprising adjusting the measurement of the first sensor of the plurality of sensors by a second value based on the signal information and in response to the measurement being above the first measurement threshold.

14. The method of claim 9, wherein determining whether the user device is within the threshold distance of the vehicle is based on Global Positioning System (GPS) information of the user device.

15. The method of claim 9, wherein the control module determines that the user device is within the threshold distance of the vehicle in response to the user device being connected to the communication gateway.

16. The method of claim 9, wherein the ping signal is a Bluetooth signal.

* * * * *